ELLIS & WHITE.

Revolver.

No. 1,528. Reissued Aug 25, 1863

Witnesses:
J. W. Coombs
G. W. Reed

Inventors.
W. C. Ellis - J. N. White
Per
Munn & Co
Attorneys

N. PETERS, PHOTO-LITHOGRAPHER, WASHINGTON, D. C.

UNITED STATES PATENT OFFICE.

EBENEZER H. PLANT, HENRY REYNOLDS, AMZI P. PLANT, AND ALFRED HOTCHKISS, OF NEW HAVEN, CONNECTICUT, ASSIGNEES OF WILLARD C. ELLIS AND JOHN N. WHITE.

IMPROVEMENT IN REVOLVING FIRE-ARMS.

*Specification forming part of Letters Patent No.* 24,726, *dated July* 12, 1859; *reissue No.* 1,528, *dated August* 25, 1863.

DIVISION A.

*To all whom it may concern:*

Be it known that WILLARD C. ELLIS and JOHN N. WHITE, both of Springfield, in the county of Hampden and State of Massachusetts, have invented a new and useful Improvement in Fire-Arms; and we, EBENEZER H. PLANT, of New Haven, in the county of New Haven; HENRY REYNOLDS, of Springfield, aforesaid; AMZI P. PLANT, of Southington, in the county of Hartford and State of Connecticut, and ALFRED HOTCHKISS, of Southington, aforesaid, assignees of Letters Patent granted to said ELLIS and WHITE for said improvement, do hereby declare that the following is a full, clear, and exact description of the same, reference being had to the accompanying drawings forming a part of this specification.

This invention relates to that description of fire-arms known as revolvers; and it consists in the construction of the many-chambered cylinder to provide for the loading of the chambers in front with metallic cartridges carrying their own priming, and for the firing of such cartridges.

Figure 2:
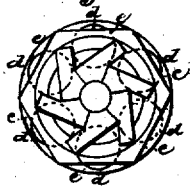
Figure 1:
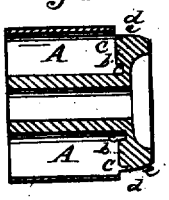
Figure 3:
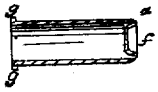

Figure 1 in the accompanying drawing is a central longitudinal section of a cylinder constructed according to the invention. Fig. 2 is a rear-end view of the same. Fig. 3 is a central longitudinal section of the shell of a cartridge employed in connection with the improvement.

Similar letters of reference indicate corresponding parts in the several figures.

To enable the nature of the invention to be better understood, we will, before describing its construction, first describe, briefly, the cartridge-shell represented in Fig. 3. The principal peculiarity of this shell is, that instead of having a hollow flange projecting outward all round its rear edge for the purpose of containing the fulminating priming, as in the metallic cartridges heretofore constructed, it has for that purpose a hollow flange, *a*, projecting in a rearward direction only, and no larger in its outer circumference than the other portion of the shell, which is cylindrical, and of a size to fit snugly into the bore of the chamber. It is represented with a flange, *g*, all round its front end, to lap over the edges of the muzzle of the chamber, and thereby enable it to be easily laid hold of to draw it out with the fingers after its ball has been discharged; but this flange *g* is not indispensable.

The cylinder has its chambers A bored cylindrically from its front end to within a suitable distance of its rear end, and at the back or bottom of each chamber there is cut an annular groove, *c*, the outer circumference of which forms a continuation of the bore, such groove forming a central inward and forward projection, *b*, at the back or bottom of the chamber, the said groove being of a width, depth, and form to receive the flange *a* on the shell of the cartridge. The rear end of the cylinder has its exterior cut away opposite to each chamber, as shown at *e*, to form an opening, *d*, into the chamber, through which the hammer of the fire-arm can enter to strike the flange *a* of the cartridge, for the purpose of effecting the explosion of the charge; but the rear of each chamber is otherwise closed to stop the cartridge and prevent it from slipping through. The hammer of the fire-arm may be applied in the usual or any convenient manner to strike through the openings *e e* upon the flanges of the cartridge.

When the cartridge is inserted in the chamber from the front end thereof, its flange *a* enters the groove *c* of the chamber, and the central projection *b* enters and fits the cavity *f*, which is formed in the rear of the cartridge within its flange *a*, and so serves to support the flange of the cartridge firmly against the blow of the hammer, and insure the explosion of the fulminating priming being thereby effected. The cartridges may be withdrawn from the cylinder by taking hold of the flanges *g*, or, if they have no flanges, they may be pushed out or started forward till they can be taken hold of in front by the insertion of a suitable instrument through the openings *d d*.

The usual method of constructing the many-chambered cylinder for use with fixed ammunition is to have the chambers bored of a uniform size entirely through the cylinder, so that the metallic cartridges can be slipped in at the rear end of the chamber. Behind the cartridges there is usually placed either a revolving recoil-shield, which is sometimes movable longitudinally, so as to be pressed up against the rear ends of the cartridges; or the recoil-shield is fixed, and space sufficient for the rear flange of the cartridge to pass is allowed between the recoil-shield and the chambers. When an explosion takes place, the cartridge-case is driven back with great force against the recoil-shield.

It will be observed that in our improvement no movable recoil-shield is used, and the cartridge-case is never driven out of or away from the chamber, because it is contained wholly within the chamber. The strength and durability of the cylinder are thus increased, and the clogging or stoppage of the cylinder by the blowing back of the cartridge is wholly prevented.

What we claim as the invention of WILLARD C. ELLIS and JOHN N. WHITE, and desire to secure by Letters Patent, is—

The construction of the rear portions of the chambers of the cylinder of a revolver with openings through which the hammer may strike the cartridges, but otherwise closed or partly closed to prevent the cartridge from slipping through, whereby the loading at the front with a metallic cartridge carrying its own priming, and the firing of such cartridge by the blow of the hammer upon its shell, as herein specified, are provided for, without the employment or arrangement of an abutment to press up against the rear end of the cartridge-case, all as set forth.

EBENEZER H. PLANT.
HENRY REYNOLDS.
AMZI P. PLANT.
ALFRED HOTCHKISS.

Witnesses:
J. W. MANSFIELD,
SAML. B. GORHAM.